May 10, 1932.  H. M. BROWN  1,857,998
MACHINE FOR BUILDING TIRE FLAPS
Filed Aug. 6, 1928    2 Sheets-Sheet 1

Inventor
Harold M. Brown
By
Attorney

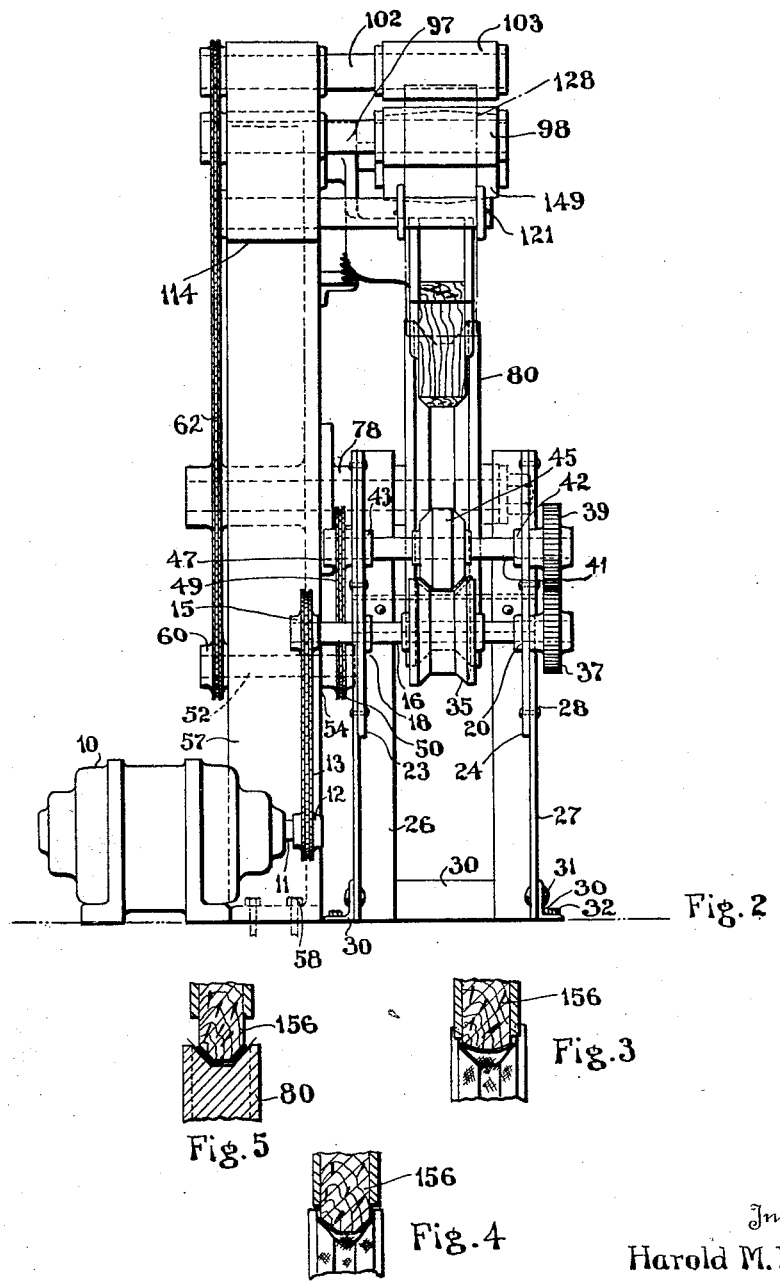

Patented May 10, 1932

1,857,998

UNITED STATES PATENT OFFICE

HAROLD M. BROWN, OF AKRON, OHIO, ASSIGNOR TO THE GOODYEAR TIRE & RUBBER COMPANY, OF AKRON, OHIO, A CORPORATION OF OHIO

MACHINE FOR BUILDING TIRE FLAPS

Application filed August 6, 1928. Serial No. 297,794.

This invention relates to machines for laminating fabrics and it has particular relation to an apparatus for and a method of assembling and simultaneously forming laminated fabric strips into an elongate band which shall be especially applicable for manufacturing tire flaps for employment in pneumatic tire casings.

An object of the invention is to provide an improved apparatus and method for preforming plies of fabric transversely and longitudinally and stitching the plies in laminated relation.

According to this invention, which constitutes an improvement over that described and illustrated in the application of Fern E. Ensley, Serial No. 253,061, filed February 9, 1928, and assigned to The Goodyear Tire & Rubber Company, Akron, Ohio, individual plies of fabric are drawn under tension over suitable rollers, whereafter they are directed between a drum of predetermined peripheral contour, and pre-forming and ply stitching shoes. The shoes each have a varying contour so that each ply is pre-formed progressively, and thereafter stitched to an adjacent ply. Following this operation, the bottom ply, which is preferably wider than the others, is folded laterally over the edges of the remaining plies, whereupon the assembled structure is vulcanized.

For a better understanding of the invention, reference may now be had to the accompanying drawings, forming a part of the specification, of which;

Figure 2 is an end view of the machine shown by Figure 1, and taken in the direction indicated by the arrow A;

Figure 3 is a cross-sectional view of one of the preforming shoes, taken substantially along the line III—III of Figure 1;

Figure 4 is a cross-sectional view of the same shoe but taken substantially along the line IV—IV; and Figure 5 is still another cross-sectional view of the shoe, taken substantially along the line V—V.

Figure 1:
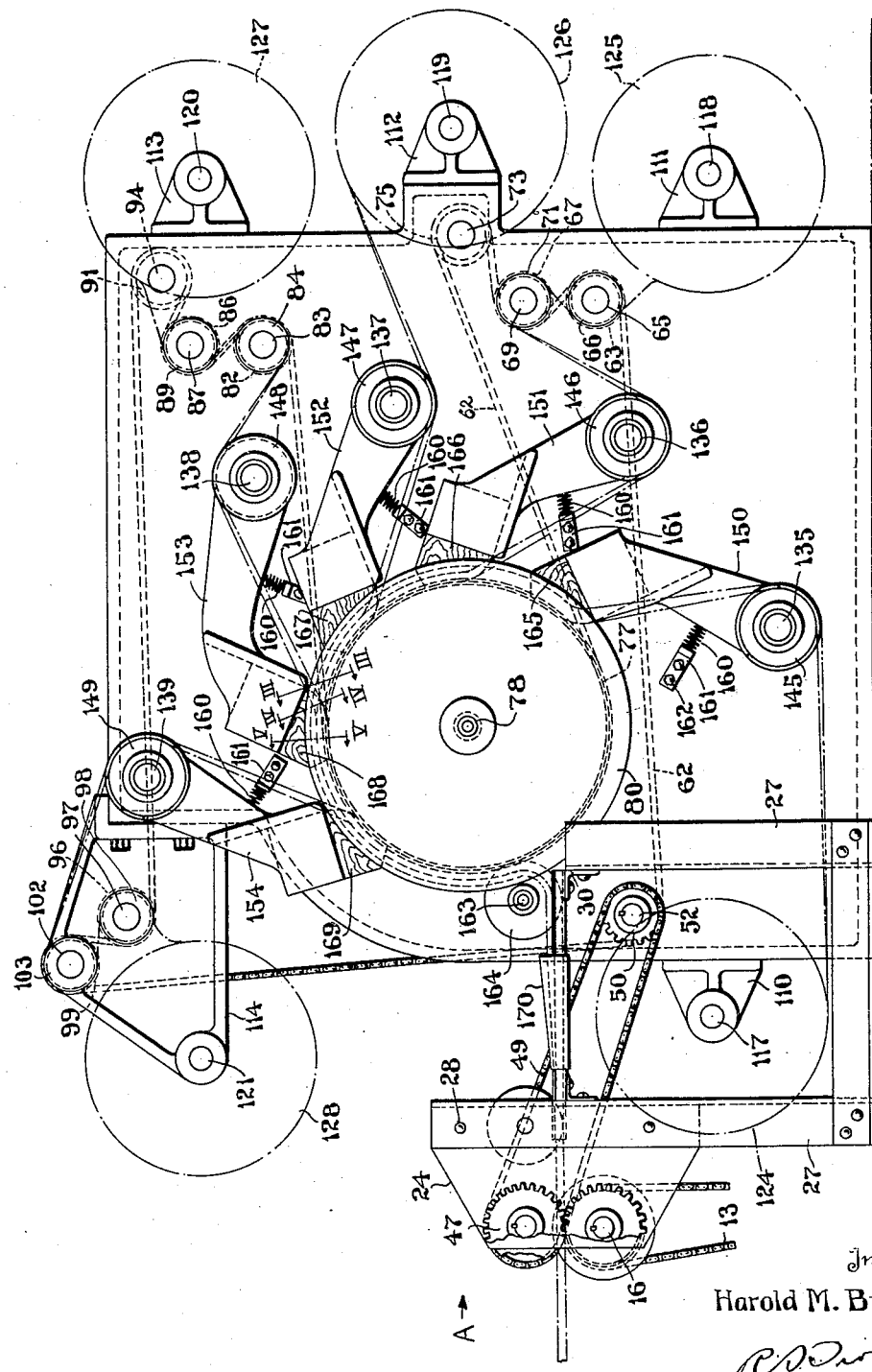
Figure 1 is a side elevational view of a machine constructed according to one embodiment of the invention.

Referring to Figure 2, a motor 10 has a shaft 11 upon the end of which is keyed a sprocket 12. A chain 13, trained about the sprocket 12, also is trained about a sprocket 15 which is rigidly secured to an outer end of a shaft 16. The latter is rotatably supported in bearings 18 and 20 forming a part of brackets 23 and 24, respectively, which are secured to upright angle bars 26 and 27 by rivets 28. These angle bars form part of a frame structure, in which four of such bars are connected at their lower ends by horizontally disposed angle bars 30, riveted thereto, as indicated at 31, and bolted to the floor, as indicated at 32.

The shaft 16, intermediate the bearings 18 and 20, supports a grooved roller 35 rigidly secured thereon, and at its outer end adjacent the bearing 20 has keyed thereto a pinion 37. This pinion meshes with a pinion 39, fastened on a shaft 41 disposed in bearings 42 and 43 which are arranged in the brackets 23 and 24, respectively, directly above the bearings 18 and 20. Intermediate its ends, the latter shaft supports a roller 45, which has an outer peripheral contour complementary to and adapted to roll within the groove of the roller 35 on the shaft 16. On its end adjacent the bearing 43, the shaft 41 has a sprocket 47, over which a chain 49 that extends over a second sprocket 50 is trained. The latter is keyed to one end of a shaft 52 which is rotatably supported in a bearing 54 formed in a large vertically disposed frame 57. Bolts 58 secure the frame rigidly to the floor. On its opposite end the shaft 52 has a sprocket 60 rigidly secured thereon, over which is trained a chain 62.

The latter chain is trained over a sprocket 63 rigidly secured to a shaft 65 journalled in the frame 57, thence between this sprocket and a sprocket 67 keyed to a shaft 69 supported by the frame 57 directly above the shaft 65, over the latter sprocket, and an idling sprocket 75 keyed to a shaft 73 journalled in the frame, and thereafter over a relatively large sprocket 77 which is rigidly secured on a shaft 78 also journalled in the frame. From the latter sprocket, the chain extends under and over a pair of sprockets 82 and 86, respectively, which are disposed above the sprockets 63 and 67, and are keyed respectively to shafts 83 and 87 journalled in the frame, thereafter over an idling sprocket 91 keyed to a shaft 94, thence under and over sprockets 96 and 99 keyed to shafts 97 and 102 respectively, that are journalled in a bracket 114 projecting from an upper corner of the frame 57, and thereafter from the latter sprocket to the sprocket 50.

The shafts 65, 69, 83, 87, 97 and 102 are provided, respectively, with rollers 66, 71, 84 89, 98 and 103, rigidly secured thereon, and which are disposed on the side of the frame 57 opposite the aforesaid sprockets. On the end of the shaft 78 opposite the sprocket 77, a large drum 80 rigidly secured thereon has a trapezoidally grooved periphery, as shown by Figures 2 and 5, which groove is substantially the shape of a flap employed between the inner tube of a tire and the bead portions of the latter. Bearing brackets 110, 111, 112, 113 and the aforesaid bracket 114, secured in spaced relation about the edges of the frame 57, rotatably support shafts 117, 118, 119, 120 and 121, respectively, while such shafts in turn respectively support rolls of fabric 124, 125, 126, 127 and 128.

Other shafts 135, 136, 137, 138 and 139, disposed in substantially equally spaced relation about the drum 80 and juxtaposed with respect to the rolls 124, 125, 126, 127 and 128, respectively, are secured in the frame 57, and rotatably support rollers 145, 146, 147, 148 and 149, respectively. These shafts also rotatably support arms 150, 151, 152, 153 and 154, respectively, which at their outer ends are provided with wooden shoes 165, 166, 167, 168 and 169, the contour of which varies, as best shown by Figures 3, 4 and 5, from substantially a plane or flat surface to one complementary to and adapted to project within the groove in the drum 80. These shoes are resiliently maintained against the drum by springs 160 that at one end engage the arms and at their other ends brackets 161, which are secured to the frame 57 by stud bolts 162.

A resilient roller 164, such as one composed of soft rubber, is rotatably mounted on a shaft 163 supported by the frame 57, and is disposed adjacent the drum 80, on the side thereof adjacent the rollers 35 and 45. This roller has a peripheral contour complementary to the groove in the drum 80, and is adapted normally to coact therewith.

In operation of the above described mechanism, fabric on the roll 124, which preferably is relatively wide canton flannel, is conducted over the roller 145, thence between the shoe 165 and is stitched initially to the grooved periphery of the drum 80. Similarly, rubberized fabric from the roll 125 is trained over the roller 66, reversely over the roller 71, over the roller 146, and thence between the drum and the shoe 166 mounted on the arm 151. Fabric from the roll 126 is fed directly under the roller 147 to a position between the drum and the shoe 167 mounted on the arm 152. From the roll 127, fabric is fed over the rollers 89 and 84 and thence over the roller 148 between the shoe 168 mounted on the arm 153 and the drum, whereas fabric from the roll 128 is fed over the rollers 103 and 98 and thence over the roller 149 to a position between the drum and the shoe 169 mounted on the arm 154.

Energization of the motor 10 drives the rollers 35, 45, the grooved wheel 80, and the rollers 66, 71, 84, 89, 98 and 103. The fabrics which have initially been fed over the drum 80 between the roller 164 and such drum and between the rollers 35 and 45, are drawn by frictional contact of the last two mentioned rollers, from their respective rolls in the manner as previously described. As each strip of fabric is tensionally drawn over its respective shoes, it is progressively preformed, as shown by Figures 3, 4 and 5, whereafter it is stitched by the end portion of the shoe, which is disposed within the groove in the periphery of the drum 80. After the fabrics are stitched together, the bottom ply of flannel which is conducted from the roller 124, is folded about the edge portions of the other plies by a conventional folding device indicated at 170, whereafter the unitary strip thus formed is severed into suitable lengths and vulcanized into annular form. Preferably in this construction, the movement of the plies results largely from the pull exerted thereon by the rollers 35 and 45, and hence each ply is frictionally drawn over its respective shoe. The tensioning of the plies as they are drawn over the shoes prevents the forming of any wrinkles such as might otherwise occur, because of the frictional engagement of the shoes with the plies which tends to separate the cords within the fabric.

From the foregoing description it is apparent that a mechanism has been provided for separately treating plies of fabric under sufficient tension that they are progressively pre-formed both transversely and longitudinally. Moreover, by assembling the so preformed plies over a drum having a peripheral contour similar to the cross-sectional contour of the individual plies, the assembly is so formed that in its subsequent use in the capacity of tire flaps, it is practically unaffected by the stresses commonly set up in such flaps. Such articles of trade may be rapidly and inexpensively manufactured in this manner.

Although I have illustrated only one form which the invention may assume, and have described in detail only a single application thereof, it will be apparent to those skilled in the art that the invention is not so limited, but that various modifications may be made therein without departing from the spirit of the invention or from the scope of the appended claims.

What I claim is:

1. An apparatus for assembling multi-ply material comprising means for supplying a plurality of strips of material, individual means for stitching each strip upon an adjacent strip, such means comprising a resiliently pressed shoe having a surface varying progressively from substantially flat to a predetermined contour.

2. An apparatus for assembling multi-ply material comprising means for supplying a plurality of strips of material, and resiliently pivoted shoes adapted to stitch the strips together, such shoes having a progressively varying contour in order to first pre-form the strips.

3. An apparatus for assembling multi-ply materials comprising a frame, means for rotatably supporting a plurality of rolls of fabric on the frame, a grooved drum rotatably supported on the frame, and means for supplying the fabric from the rolls to the drum simultaneously at peripherally spaced points with respect to the latter, said means including resilient shoes supported on the frame, each of which has a face adapted to press a layer of fabric into the groove of the drum and a progressively varying contour, in order first to preform the fabric before it is applied to the drum.

4. An apparatus for assembling multi-ply materials comprising a frame, means for rotatably supporting a plurality of rolls of fabric on the frame, a grooved drum rotatably supported on the frame, and means for supplying the fabric from the rolls to the drum simultaneously but at peripherally spaced points with respect to the latter, said means including resilient pivoted shoes supported on the frame, each of which shoes has a face adapted to press a layer of fabric into the groove of the drum and a progressively varying contour, in order first to preform the fabric before it is applied to the drum.

5. An apparatus for assembling multi-ply materials comprising a frame, means for rotatably supporting a plurality of rolls of fabric on the frame, a grooved drum rotatably supported on the frame, resilient shoes supported on the frame in peripherally spaced relation about the drum, said shoes having a curved contour adapted to preform the fabric to trough-shape before it is applied to the drum, and means at the discharge side of the drum for drawing the fabric thereover.

In witness whereof, I have hereunto signed my name.

Signed at Akron, in the county of Summit and State of Ohio, U. S. A., this 4th day of August, 1928.

HAROLD M. BROWN.